United States Patent
Kim

(10) Patent No.: US 12,249,740 B2
(45) Date of Patent: Mar. 11, 2025

(54) SECONDARY BATTERY MANUFACTURING METHOD COMPRISING DIVISIONAL INJECTION OF ELECTROLYTE

(71) Applicant: LG ENERGY SOLUTION, LTD., Seoul (KR)

(72) Inventor: Young Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/275,141

(22) PCT Filed: Oct. 13, 2022

(86) PCT No.: PCT/KR2022/015519
§ 371 (c)(1),
(2) Date: Jul. 31, 2023

(87) PCT Pub. No.: WO2023/080475
PCT Pub. Date: May 11, 2023

(65) Prior Publication Data
US 2024/0128621 A1    Apr. 18, 2024

(30) Foreign Application Priority Data

Nov. 2, 2021   (KR) .......................... 10-2021-0149103

(51) Int. Cl.
*H01M 50/609*  (2021.01)

(52) U.S. Cl.
CPC .................. *H01M 50/609* (2021.01)

(58) Field of Classification Search
CPC .. H01M 50/60; H01M 10/052; H01M 50/609; Y02E 60/10
USPC .......................................................... 141/1
See application file for complete search history.

(56) References Cited

U.S. PATENT DOCUMENTS

2016/0133914 A1   5/2016  Oh et al.
2020/0358147 A1*  11/2020  Dou .................... H01M 10/446

FOREIGN PATENT DOCUMENTS

| CN | 204668386 U |   | 9/2015 |
| JP | 2003-86173 A |   | 3/2003 |
| JP | 2003086173 A | * | 3/2003 |
| JP | 2005-166487 A |   | 6/2005 |
| JP | 2017-208182 A |   | 11/2017 |
| JP | 6762138 B2 |   | 9/2020 |
| JP | 2020-184452 A |   | 11/2020 |
| KR | 10-1997-0054629 A |   | 7/1997 |
| KR | 10-0735657 B1 |   | 7/2007 |
| KR | 10-2015-0014330 A |   | 2/2015 |
| KR | 10-2018-0071044 A |   | 6/2018 |
| KR | 10-2019-0060214 A |   | 6/2019 |
| KR | 10-2020-0065509 A |   | 6/2020 |
| KR | 10-2182688 B1 |   | 11/2020 |
| KR | 10-2021-0090916 A |   | 7/2021 |
| WO | WO-2018117487 A1 | * | 6/2018 ........ H01M 10/049 |

OTHER PUBLICATIONS

WO 2018117487 A1—English Translation (Year: 2018).*
JP 2003-086173 A—English Translation (Year: 2003).*
International Search Report (PCT/ISA/210) issued in PCT/KR2022/015519 mailed on Jan. 30, 2023.

* cited by examiner

*Primary Examiner* — Timothy L Maust
*Assistant Examiner* — Christopher M Afful
(74) *Attorney, Agent, or Firm* — Birch, Stewart, Kolasch & Birch, LLP

(57) ABSTRACT

A secondary battery manufacturing method injects large amount of electrolyte twice, and reflects the average value of the amount of firstly injected electrolyte into the amount of secondly injected electrolyte to allow electrolyte to be quantitatively injected in a short time. This can reduce the defect rate when manufacturing batteries such as a large-capacity secondary battery or a long cell model secondary battery in which electrolyte 200 g or more is injected, and can also better improve the performance of the secondary battery.

9 Claims, No Drawings

SECONDARY BATTERY MANUFACTURING METHOD COMPRISING DIVISIONAL INJECTION OF ELECTROLYTE

TECHNICAL FIELD

The present invention relates to a manufacturing method of a secondary battery that includes split injection of electrolyte.

This application claims the priority benefit based on Korean Patent Application No. 10-2021-0149103, filed on Nov. 2, 2021, and the entire contents of the Korean patent application are incorporated herein by reference.

BACKGROUND TECHNOLOGY OF THE INVENTION

While a secondary battery is in the limelight as an energy source with the development of electronic devices, the performance of the secondary battery is expected to be a main factor that affects the performance of electronic devices or medium and large size devices, as nowadays a lithium secondary battery alike is being used as power supply of medium and large size devices such as an electric car.

The secondary battery is manufactured by inserting an electrode assembly that is assembled by making a positive electrode, a negative electrode, and a separating membrane into a battery case such as a pouch, and sealing after injecting electrolyte into the case. Here, because the performance of a battery cell is decided by the impregnated state of the electrolyte being injected into the case, it is important to inject the electrolyte more quantitatively, and it takes up significant amount of time to manufacture a battery cell.

However, with the recent growing use of battery cells such as a large secondary battery or a long cell model that injects significant amount of electrolyte, attempts are being made to inject accurate amount of electrolyte in a relatively short amount of time. For example, a technology has been developed where electrolyte injection and impregnation can be performed in a short time by high pressure-vacuum injecting electrolyte all at once into a fixed battery case with a fast injection speed. However, the technology has an issue of not being able to quantitatively injecting electrolyte when the amount of electrolyte exceeds over 200 g. To solve this problem, a split injection is performed twice, and in the case where injection speed is increased, the amount of injected electrolyte is quantitatively controlled, but there may be a loss in electrolyte and contamination in internal/external part of the case due to fast injection speed that causes a battery cell to bump against something and has injected electrolyte to be splashed out. Therefore, when large amount greater than or equal to 200 g of electrolyte is being injected, a technology that allows electrolyte to be injected quantitatively in a short time without any internal/external contamination of a battery cell is being required.

PATENT DOCUMENT

Korean Patent Publication No. 10-2019-0060214

DESCRIPTION OF THE INVENTION

Technical Problem

The present invention is directed to providing developed technology that can inject large amount of electrolyte greater than or equal to 200 g quantitatively in a short time when manufacturing a secondary battery.

Technical Solution

To solve the above-described problem,
an exemplary embodiment of the present invention provides a manufacturing method of a secondary battery, which includes:
firstly injecting electrolyte into a battery case having an electrode assembly located therein;
secondly injecting electrolyte into a battery case where after the firstly injected electrolyte; and
sealing the battery case after the secondly injected electrolyte, wherein an amount of the secondly injected electrolyte is determined by reflecting a correction value calculated from an average value of the amount of firstly injected electrolyte from n–$a^{th}$ (where a is 10≤a≤20, an integer) to $n^{th}$ earlier times, to a predetermined amount of the secondly injected electrolyte for the n+$1^{th}$ time.

Here, the average value of the amount of the firstly injected electrolyte may be obtained through the process below: calculating an average injection value (A) and a standard deviation (σ) of the amount of firstly injected electrolyte from n–$a^{th}$ (where a is 10≤a≤20, an integer) to $n^{th}$ times; setting up a confidence interval from the average injection value (A) and standard deviation (σ); selecting values that fall within the set confidence interval out of number of 'a' of the amount of firstly injected electrolyte used for calculating the average injection value (A) and the standard deviation (σ), and calculating the average value of the values that fall within the set confidence interval which is the average value in the confidence interval.

In addition, the correction value may be a deviation between a sum of confidence interval average value of the amount of firstly injected electrolyte and a predetermined secondly electrolyte injection amount, and a total electrolyte injection amount.

Furthermore, the manufacturing method of the secondary battery may be performed by using a pump-type injection apparatus that injects electrolyte through a syringe, and the amount of secondly injected electrolyte is controlled by calculating a driving value of the syringe based on the correction value, and reflecting the calculated driving value on a predetermined syringe driving value to operate the syringe.

Meanwhile, the manufacturing method of the secondary battery may comprise measuring the amount of firstly injected electrolyte after firstly injecting electrolyte into the battery case and saving the measured amount of firstly injected electrolyte after measuring the amount of firstly injected electrolyte.

In addition, the amount of secondly injected electrolyte may be 10 to 60% of a total amount of injected electrolyte, and specifically be 20 to 40% of a total amount of injected electrolyte.

Additionally, the total amount of injected electrolyte into the battery case may be greater than or equal to 200 g.

In addition, a total time that takes to inject the firstly injected electrolyte and the secondly injected electrolyte into the battery case may be less than 3 seconds.

Advantageous Effects

The manufacturing method of the secondary battery according to the present invention injects large amount of electrolyte twice, and reflects the average value of the amount of firstly injected electrolyte onto the amount of secondly injected electrolyte so that allows electrolyte to be quantitatively injected in a short time. This can not only greatly reduce the defect rate when manufacturing a battery cell such as a large-capacity secondary battery or a long cell model secondary battery into which electrolyte greater than or equal to 200 g is injected, but it can also better improve the performance of the secondary battery.

DETAILED DESCRIPTION OF THE EMBODIMENTS

The present disclosure and methods of accomplishing the same may be understood more readily by redescribed embodiments may be modified in various different ways, thereby exemplary embodiments described in detail in the detailed description.

However, the present disclosure may be embodied in many different forms, and should not be construed as being limited to the embodiments set forth herein, and include all modifications, equivalents or alternatives within the spirit and technical scope of the present disclosure.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed therebetween. In contrast, when a part of a layer, a film, a region or a plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In the present invention, "ppm" indicates the number of secondary batteries being produced per minute, and it may represent process efficiency. For example, 15 ppm means 15 secondary batteries are produced in one minute.

In addition, in the present invention, "total injection time" means the time that takes to inject electrolyte into a battery case through a syringe on the injection device, and this is when the amount of electrolyte being injected is calculated and based on the calculated amount of electrolyte, the time that takes to adjust the piston on the syringe may be excluded.

Hereinafter, the present invention will be described in detail.

Manufacturing Method of Secondary Battery

An exemplary embodiment of the present invention provides a manufacturing method of a secondary battery, which includes:
firstly injecting electrolyte into a battery case where an electrode assembly is inserted with a predetermined injection amount;
secondly injecting electrolyte into the battery case where electrolyte is firstly injected; and
sealing the battery case where electrolyte is secondly injected,
when electrolyte injection is performed for the $n+1^{th}$ time, the amount of electrolyte being injected in secondly injection is determined by reflecting the correction value calculated from the average value of the amount of firstly injected electrolyte from $n-a^{th}$ (where a is 10≤a≤20, an integer) to $n^{th}$ times, to a predetermined amount of secondly injecting.

The manufacturing method of the secondary battery according to the present invention is performed by using a pump-type injection apparatus that injects electrolyte through syringe, and it includes a stage where electrolyte is injected into a battery case inserted an electrode assembly on two separate occasions. Specifically, the manufacturing method includes a firstly injecting electrolyte into the battery case where the electrode assembly is inserted with a predetermined injection amount; secondly injecting electrolyte into the battery case where electrolyte is firstly injected; and sealing battery case where electrolyte is secondly injected.

Compared to the case where the electrolyte is injected all at once, the present invention can quantitatively control the total amount of electrolyte being injected by injecting large amount of electrolyte on two separate occasions, and it can improve fairness and productivity of the operation compared to when electrolyte is split-injected three or more times.

In addition, in terms of the manufacturing method, the stage of firstly injecting is a process of electrolyte injected for the first time is based on the predetermined amount of injected electrolyte, the predetermined amount of injected electrolyte may be 40 to 90% of the total amount of injected electrolyte, and specifically be 60 to 80% of the total amount of injected electrolyte. The present invention can prevent the accuracy of the amount of injected electrolyte being reduced due to the increasing correction error of the amount of secondly injected electrolyte, by adjusting the amount of firstly injected electrolyte to be greater than or equal to 40 wt % of the total amount of electrolyte.

The conventional technologies of split injecting electrolyte mostly inject most of the electrolyte in firstly injection, and because secondly injection is performed in a way that it fills up what is being lacking from the total amount of electrolyte injection, the amount of firstly injected electrolyte is over 95%. In this case, the total amount of injected electrolyte may be quantitatively controlled, however a significant amount of electrolyte is injected by using a high-pressure pump, which causes the electrolyte to splash out and be lost and contaminate the internal/external part of the case. In addition, injecting excess amount of electrolyte in the firstly electrolyte injection may reduce the battery production efficiency depending on the speed of electrolyte injection. However, the present invention may improve such matter by controlling the amount of firstly injected electrolyte to lower than or equal to 90 wt % of the total amount of electrolyte.

The present invention split injects excess amount of electrolyte, it can quickly and quantitatively inject electrolyte without any contamination due to electrolyte by using the average amount of firstly injected electrolyte into the battery case when secondly injecting the electrolyte.

Specifically, when electrolyte injection is performed for the $n+1^{th}$ time in the present invention, the amount of electrolyte being injected in secondly injection is determined by reflecting the correction value calculated from the average value of the amount of firstly injected electrolyte from $n-a^{th}$ (where a is 10≤a≤20, an integer) to $n^{th}$ times.

Here, the average value of the amount of firstly injected electrolyte can be derived from the amount of prior firstly injected electrolyte into the battery case, which in detail can be derived from the amount of firstly injected electrolyte of the prior 10 to 20 battery cases of the current battery case where electrolyte being injected.

For example, in the manufacturing process of the secondary battery, the amount of secondly injected electrolyte of the 21$^{th}$ battery case where electrolyte is being injected can be derived from the amounts of 10 firstly injected electrolyte, from 11$^{th}$ to 20$^{th}$ battery cases where electrolyte has been firstly injected.

In addition, the average value of the amount of firstly injected electrolyte can be obtained by calculating the average injection value (A) and a standard deviation ($\sigma$) of the amount of firstly injected electrolyte from n–a$^{th}$ (where a is $10 \leq a \leq 20$, an integer) to n$^{th}$ times; setting up confidence interval from the average injection value (A) and standard deviation ($\sigma$); selecting values that fall within the set confidence interval out of number of 'a' of the amount of firstly injected electrolyte used for calculating the average injection value (A) and standard deviation ($\sigma$), and calculating their average value which is the average value in the confidence interval.

Specifically, first, calculate the average injected value (A, average) and standard deviation ($\sigma$) of the amount of firstly injected electrolyte with respect to the 10 to 20 previous battery cases, then set up the confidence interval (CI) from the average injected value (A) and standard deviation ($\sigma$). Here, the confidence interval is the interval where the standard deviation ($\sigma$) is reflected on the average injected value (A), and the lower bound may be greater than the value where the standard deviation ($\sigma$) is subtracted from the average injected value (A) and the upper bound may be smaller than the value the standard deviation ($\sigma$) is added to the average injected value (A) (A–$\sigma$<CI<A+$\sigma$). Next, confidence interval average value (CIA) can be obtained by selecting only the ones that falls within the set confidence interval (CI) among the 10 to 20 amounts of firstly injected electrolyte used to calculate the average injected value (A) and standard deviation ($\sigma$), and calculating the average value of the selected amount of firstly injected electrolyte.

The present invention may greatly reduce the proportion of defective battery cells by using the calculated confidence interval average value (CIA) as the average value of the amount of firstly injected electrolyte, compared to the case where the amount of secondly injected electrolyte is decided only by referring to the amount of firstly injected electrolyte.

In addition, the average value of the amount of firstly injected electrolyte, that is, the confidence interval average value (CIA) is used to calculate the correction value. Specifically, the present invention may calculate a deviation between a sum of confidence interval average value of the amount of firstly injected electrolyte and a predetermined secondly electrolyte injection amounts, and a total electrolyte injection amount, as the correction value For example, when the predetermined value of the amount of the firstly and secondly injected electrolyte is respectively 200 g and 100 g, and the confidence interval average value (CIA) of the amount of electrolyte injected into previous battery cases is 200.1 g, then the correction value can be calculated by the deviation of the total injected electrolyte (300 g), which is 0.1 g.

The correction value calculated is reflected in the predetermined amount of secondly injected electrolyte, and the electrolyte may be secondly injected into the battery case by using the correction value-reflected predetermined amount of secondly injected electrolyte.

Specifically, the manufacturing method according to the present invention uses a pump-type injection apparatus where electrolyte is injected into a battery case through a syringe. The pump-type injection apparatus consists of the first syringe that firstly injects electrolyte into the battery case; and the second syringe that secondly injects electrolyte into the battery case where electrolyte has been firstly injected. The first and second syringes are each coupled to a high-pressure pump that injects predetermined amount of electrolyte into the battery case. Here, depending on the predetermined amount of injected electrolyte, the syringes each have shift value of the piston provided on the inside to be set on a per-mm basis of the amount of injected electrolyte. The present invention converts correction value into the amount of injected electrolyte per distance (mm) moved by the piston provided in the second syringe, and by reflecting this value to the predetermined piston shift value of the second syringe, it can reflect to the amount of secondly injected electrolyte into the battery case.

Meanwhile, the total amount of injected electrolyte into the battery case in the present invention may be over 200 g, specifically over 250 g, over 300 g, over 400 g, 200 to 1000 g, 300 to 1000 g, 200 to 500 g, 300 to 800 g, or 300 to 500 g.

In addition, the amount of secondly injected electrolyte may be 10 to 60% of the total amount of injected electrolyte, and specifically may be 20 to 40%. The present invention can prevent the accuracy of the amount of injected electrolyte being reduced due to the increasing correction error of the amount of secondly injected electrolyte, by adjusting the amount of secondly injected electrolyte to be greater than or equal to 10 wt % of the total amount of electrolyte. Furthermore, adjusting the amount of secondly injected electrolyte to be lower than or equal to 60 wt % of the total amount of electrolyte can prevent the battery case from being internally/externally contaminated by the electrolyte or prevent the production efficiency of batteries from being reduced.

In addition, as the electrode assembly inserted battery case is fixed, the time that takes for the entire electrolyte to be injected may be less than 3 seconds, or specifically less than 2.5 seconds, less than 2 seconds, 0.5 to 2.5 seconds, 1 to 2.5 seconds, or 1.5 to 2.5 seconds. In terms of the present invention, the time that takes from when electrolyte is firstly being injected to when the electrolyte-injected secondary battery is being sealed includes the time that takes to inject electrolyte into the secondary battery case twice (the sum of firstly and secondly injection time) and the time that takes to calculate and adjust the amount of secondly injected electrolyte followed by firstly injection. The present invention may maximize the production efficiency and productivity of a secondary battery by adjusting the total time that takes to inject electrolyte into less than 3 seconds, and may also prevent performance degradation of the battery by minimizing the time that electrolyte is exposed to the air.

Furthermore, the manufacturing method of the secondary battery according to the present invention may further include measuring the amount of firstly injected electrolyte after firstly injecting electrolyte into the battery case.

Specifically, according to the present invention, once the battery case gets fixed into the pump-type injection apparatus that is being used to inject electrolyte into the battery case through a syringe, the weight of the electrode assembly-inserted battery case may be measured before the injection of electrolyte, and the amount of firstly injected electrolyte can be measured by measuring the weight of the battery case with firstly injected electrolyte added right after to the weight-measured battery case.

While the amount of firstly injected electrolyte into the following battery case does not affect the amount of secondly injected electrolyte, it may be measured in order to subsequently correct the amount of secondly injected electrolyte into the battery case where electrolyte will be injected. Because of this, after measuring the amount of firstly injected electrolyte, there may be an additional stage where the measured amount of firstly injected electrolyte is saved.

The manufacturing method of the secondary battery according to the present invention injects large amount of electrolyte twice, and reflects the average value of the amount of firstly injected electrolyte onto the amount of secondly injected electrolyte so that allows electrolyte to be quantitatively injected in a short time. This can not only greatly reduce the defect rate to 15 ppm or less when manufacturing battery cell such as a large-capacity secondary battery or a long cell model secondary battery in which electrolyte 200 g or more is injected, but it can also better improve the performance of the secondary battery.

DETAILED DESCRIPTION OF THE INVENTION

Hereinafter, the present invention will be described in further detail with reference to examples and comparative examples.

However, the following examples and comparative examples merely illustrate the present invention, and the content of the present invention is not limited to the following examples and comparative examples.

Examples 1 to 3

The secondary battery was manufactured by using: a first syringe that firstly injects electrolyte into a battery case; a second syringe that secondly injects electrolyte into the battery case where electrolyte is firstly injected, and the first and the second syringe are each coupled to a high-pressure pump to make a pump-type electrolyte injection apparatus.

Specifically, 100 electrode assembly-inserted battery cases were prepared, and prepared battery cases were installed to the pump-type electrolyte injection apparatus mentioned above. Then, 300 g of electrolyte was injected into the battery case and the secondary battery was manufactured after sealing the electrolyte-injected battery case. Here, the average injection value (A) and standard deviation (σ) were calculated from the amount of firstly injected electrolyte with respect to the 10 battery cases ($n-10^{th} \sim n^{th}$ battery) that had electrolyte injected before the following battery case ($n+1^{th}$ battery) had secondly electrolyte injected, and the confidence interval was set from the calculated average injection value (A) and standard deviation (σ), and selecting the values that fall within the confidence interval out of the 10 amounts of firstly injected electrolyte used to calculate average injection value (A) to derive confidence interval average value (CIA) from their average. The derived average value (CIA) was added to the predetermined amount of secondly injected electrolyte, and its deviation from the total amount of injected electrolyte (300 g) was calculated to get the correction value. The correction value was converted into the amount of injected electrolyte per distance (mm) moved by the piston provided in the second syringe, and the amount of secondly injected electrolyte into the battery case was controlled by reflecting the converted value to the predetermined shift value of the piston in the second syringe.

In addition, as indicated in Table 1 below, the condition of the firstly and secondly electrolyte injection was predetermined to inject electrolyte into each of 100 battery cases, and the final amount of injected electrolyte with respect to the manufactured secondary batteries was measured to evaluate pump accuracy and distribution of the amount injected to indicate on Table 1. Additionally, after examining the exterior of each manufactured secondary battery, it was able to identify that the internal/external part of the secondary battery in Example 3 was contaminated.

TABLE 1

| | Firstly Injection | | Secondly Injection | | | Distribution |
|---|---|---|---|---|---|---|
| | Amount Injected | Time Injected | Amount Injected | Time Injected | Pump Accuracy | of amount injected |
| Example 1 | 200 g | 2 seconds | 100 g | 1 second | ±0.5% | ±0.5 g |
| Example 2 | 150 g | 1.5 seconds | 150 g | 1.5 seconds | ±0.5% | ±0.75 g |
| Example 3 | 285 g | 3 seconds | 15 g | 0.2 second | ±0.5% | ±0.08 g |

Comparative Example 1

The secondary battery includes a syringe that injects electrolyte into a battery case, and the syringe was joined to a pump-type electrolyte injection apparatus with a high-pressure pump to manufacture the secondary battery.

Specifically, 100 electrode assembly-inserted battery cases were prepared, and prepared battery cases were installed to the pump-type electrolyte injection apparatus mentioned above. Then, 300 g of electrolyte was injected all at once into the battery case in three seconds, and the secondary battery was manufactured after sealing the electrolyte-injected battery case.

By measuring the total amount of injected electrolyte with respect to the 100 manufactured secondary batteries, it was able to identify that the pump accuracy and the distribution of the amount injected were respectively ±0.5% and ±1.5 g. Such result indicates that in the case where large amount of electrolyte 200 g or more is injected in a short time, the pump accuracy may be high, but it may practically indicate that the amount of electrolyte injected into the battery case is uneven.

Comparative Example 2

The secondary battery was manufactured by including: the first syringe that firstly injects electrolyte into a battery case; the second syringe that secondly injects electrolyte into the battery case where electrolyte is firstly injected, and the first and second syringe is each joined by a high-pressure pump to make a pump-type electrolyte injection apparatus.

Specifically, 100 electrode assembly-inserted battery cases were prepared, and prepared battery cases were installed to the pump-type electrolyte injection apparatus mentioned above. Then, 300 g of electrolyte was injected into the battery case and the secondary battery was manufactured after sealing the electrolyte-injected battery case. Here, the amount of firstly injected electrolyte was measured when secondly injecting electrolyte, and the deviation between the measured amount of firstly injected electrolyte and the total amount of injected electrolyte (300 g) was applied to the amount of secondly injected electrolyte.

By measuring the total amount of injected electrolyte with respect to the 100 manufactured secondary batteries, it was able to identify that the pump accuracy and the distribution of the amount injected were respectively ±0.5% and ±1.9 g. Such result indicates that in the case where large amount of electrolyte 200 g or more is injected in a short time, the pump accuracy may be high, but it may practically indicate that the amount of electrolyte injected into the battery case is uneven.

As above, the present invention has been described with reference to exemplary embodiments, but it should be understood by those killed in the art or those of ordinary skill in the art that the present invention can be variously modified and changed without departing from the spirit and technical scope of the present invention described in the accompanying claims.

Accordingly, the technical scope of the present invention is not limited to the content described in the detailed description of the specification, but should be defined by the claims.

The invention claimed is:

1. A manufacturing method of a secondary battery comprising: firstly injecting electrolyte into a battery case having an electrode assembly located therein; secondly injecting electrolyte into the battery case after the firstly injected electrolyte; and sealing the battery case after the secondly injected electrolyte,
   wherein an amount of the secondly injected electrolyte is determined by reflecting a correction value calculated from an average value of the amount of firstly injected electrolyte from n-a$^{th}$ (where a is 10≤a≤20, an integer) to n$^{th}$ earlier times, to a predetermined amount of the secondly injected electrolyte for the n+1$^{th}$ time, and
   wherein the average value of the amount of firstly injected electrolyte is obtained through the process below:
      calculating an average injection value (A) and a standard deviation (σ) of the amount of firstly injected electrolyte from n-a$^{th}$ (where a is 10≤a≤20, an integer) to n$^{th}$ times;
      setting up a confidence interval from the average injection value (A) and the standard deviation (σ);
      selecting values that fall within the set confidence interval among the number of 'a' of the amount of firstly injected electrolyte used for calculating the average injection value (A) and the standard deviation (σ); and
      calculating the average value of the values that fall within the set confidence interval which is the average value in the confidence interval.

2. The manufacturing method of the secondary battery of claim 1, wherein the correction value is a deviation between a sum of confidence interval average value of the amount of firstly injected electrolyte and a predetermined secondly electrolyte injection amount, and a total electrolyte injection amount.

3. The manufacturing method of the secondary battery of claim 1, wherein the manufacturing method of the secondary battery is performed by using a pump-type injection apparatus that injects electrolyte through a syringe, and
   wherein the amount of secondly injected electrolyte is controlled by calculate a driving value of the syringe based on the correction value, and reflecting the calculated driving value on a predetermined syringe driving value to operate the syringe.

4. The manufacturing method of the secondary battery of claim 1, wherein the manufacturing method further comprises measuring the amount of firstly injected electrolyte after firstly injecting electrolyte into the battery case.

5. The manufacturing method of the secondary battery of claim 4, wherein the manufacturing method further comprises saving the measured amount of firstly injected electrolyte after measuring the amount of firstly injected electrolyte.

6. The manufacturing method of the secondary battery of claim 1, wherein the amount of secondly injected electrolyte is 10 to 60% of a total amount of injected electrolyte.

7. The manufacturing method of the secondary battery of claim 1, wherein the amount of secondly injected electrolyte is 20 to 40% of a total amount of injected electrolyte.

8. The manufacturing method of the secondary battery of claim 1, wherein a total amount of injected electrolyte is 200 g or more.

9. The manufacturing method of the secondary battery of claim 1, wherein a total time to inject the firstly injected electrolyte and the secondly injected electrolyte is less than 3 seconds.

* * * * *